United States Patent

Ngo

[15] 3,651,509

[45] Mar. 21, 1972

[54] LIGHT PEN FOR DISPLAY HAVING INHERENT MEMORY

[72] Inventor: Dinh-Tuan Ngo, Colts Neck, N.J.

[73] Assignee: Bell Telephone Laboratories, Incorporated, Murray Hill, N.J.

[22] Filed: Nov. 6, 1970

[21] Appl. No.: 87,486

[52] U.S. Cl.........................340/324 R, 178/18, 250/217 SS, 315/169 TV, 340/166 EL, 340/173 PL, 340/337, 340/343

[51] Int. Cl...........................................................G08b 5/22

[58] Field of Search................340/324 R, 166 EL, 343, 337, 340/173 PL; 178/18, 19, 20; 250/217 R, 217 SS; 315/169 R, 169 TV, 10, 11, 12

[56] References Cited

UNITED STATES PATENTS

| | | | |
|---|---|---|---|
| 3,096,516 | 7/1963 | Pendleton | 340/166 El X |
| 3,262,010 | 7/1966 | Kazan | 315/169 R X |
| 3,342,935 | 9/1967 | Leiper et al. | 340/324 R X |
| 3,482,241 | 12/1969 | Johnson | 340/337 |
| 3,559,190 | 1/1971 | Bitzer et al. | 340/173 |
| 3,559,307 | 2/1971 | Barrekette et al. | 340/337 X |
| 3,573,542 | 4/1971 | Mayer et al. | 340/324 R |

*Primary Examiner*—David L. Trafton
*Attorney*—R. J. Guenther and Kenneth B. Hamlin

[57] ABSTRACT

A light pen arrangement for display systems having inherent memory (e.g., plasma display systems) which operates in conjunction with display scanning signals for writing or erasing information on the display, such as for interactive graphics applications. The scanning signals generate momentary light pulses on the display which are detected by the light pen arrangement and used to selectively produce conventional write or erase signals as the light pen is manipulated adjacent the display. The light pen arrangement can be employed also to generate "store now-display later" information and to check existing display images.

9 Claims, 5 Drawing Figures

INVENTOR
D. NGO
BY D. E. Snedeker
ATTORNEY

LIGHT PEN FOR DISPLAY HAVING INHERENT MEMORY

BACKGROUND OF THE INVENTION

This invention relates to display systems and, more particularly, to light pen arrangements for display systems having inherent memory.

Display systems are typically used for generating patterns of information or images in a two-dimensional raster for information display media, television, radar, computer input/output terminals and the like. In certain applications, such as interactive graphic display systems, it is desirable that an operator be able to draw or write images on the display by manipulation of a pen-like instrument. For example, light pen arrangements are well known for drawing images on cathode ray tube displays. However, CRT light pen arrangements require rather complex and expensive circuitry for tracking movement of the light pen so as to position the cathode ray tube beam.

Display systems having inherent memory, such as plasma displays, do not require the complex pen tracking circuitry of CRT displays and thus pen arrangements therefor typically comprise voltage pens, rather than light pens. Placement of the voltage pen adjacent a display cell directly effects lighting of the cell, the inherent memory of the cell maintaining it lighted. Though generally satisfactory, voltage pens often require the use of relatively large voltages, particularly in plasma display systems, and consequently suffer concomitant disadvantages related to cost and safety.

SUMMARY OF THE INVENTION

It is accordingly a general object of this invention to provide a new and improved light pen arrangement for display systems having inherent memory.

More particularly, it is an object of this invention to provide a simple and inexpensive light pen arrangement for such display systems, which alleviates the disadvantages of voltage pens without requiring the complex tracking circuitry of known light pen arrangements.

The above and other objects are attained in an illustrative embodiment of a light pen arrangement for use with an array of display cells having inherent memory, for example, plasma display cells. According to a feature of my invention, the illustrative light pen arrangement comprises a pen-shaped instrument including a light transducer which operates in conjunction with display scanning signals for selectively writing or erasing information in the display cells. The display scanning signals energize the display cells sequentially, each cell generating a momentary light pulse when energized.

The momentary light pulses are essentially invisible to an observer but are of sufficient duration to be detected by the light pen transducer. The detected light pulses are employed to produce conventional write or erase signals, selectively, as the light pen is moved adjacent the display cells.

Accordingly, information is written in a particular display cell, that is, the display cell is lighted, by placing the light pen adjacent the cell. During the next scanning cycle, the particular cell is momentarily energized by scanning signals applied thereto. The resulting light pulse is detected by the light pen, generating a write signal to turn the display cell ON. Thus, as an operator manipulates the light pen, each cell of the display that the light pen passes adjacent is lighted to draw the desired image.

Similarly, an existing image can be erased by using the light pen to generate erase signals as the pen is manipulated adjacent the display cells during scanning.

BRIEF DESCRIPTION OF THE DRAWING

The above and other objects and features of the invention may be fully apprehended from the following detailed description and the accompanying drawing in which.

DETAILED DESCRIPTION

Figure 1:
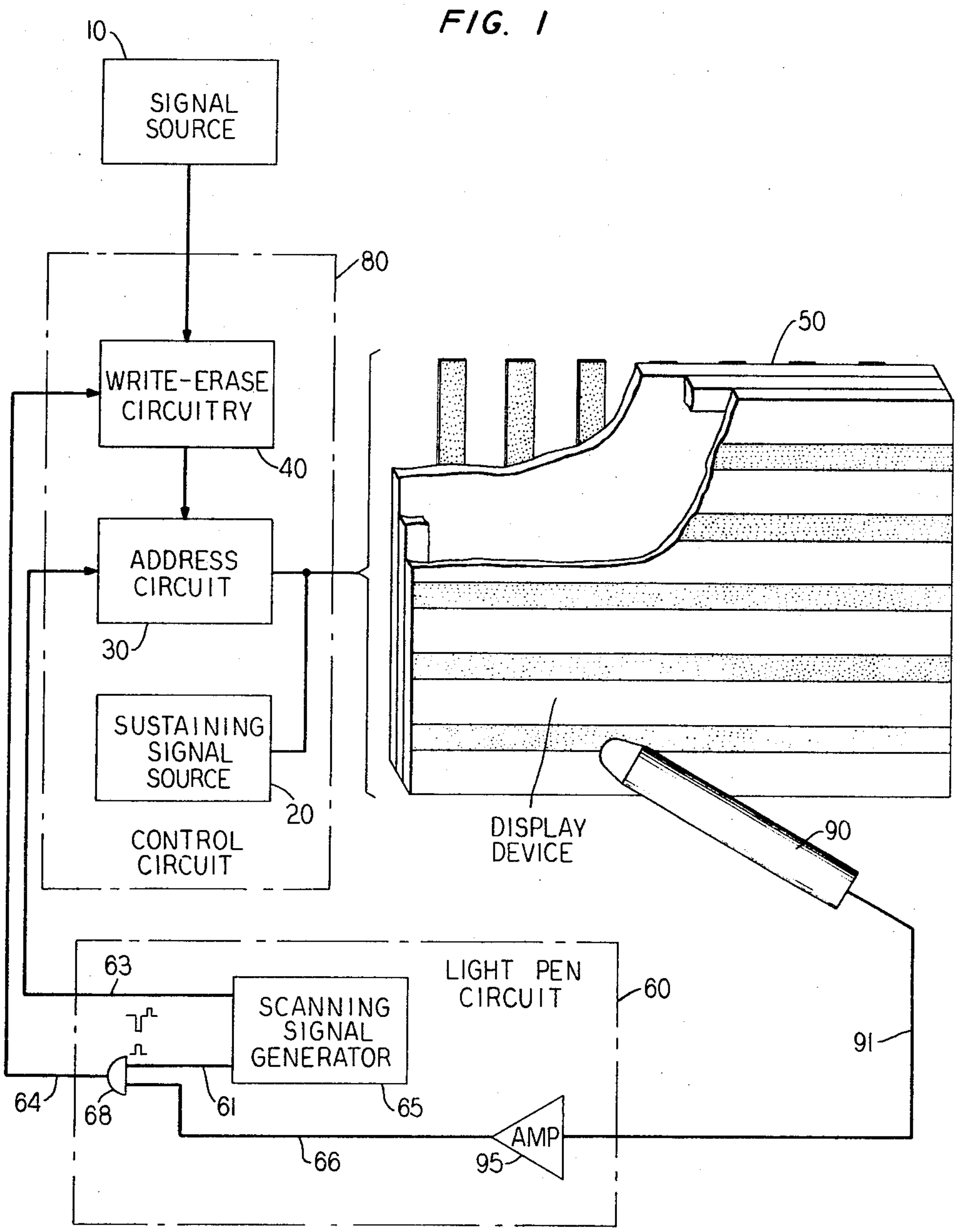
FIG. 1 is a diagram of an illustrative embodiment of a light pen and arrangement in accordance with the principles of my invention.

In FIG. 1 of the drawing an illustrative embodiment of the invention is shown in block diagram form comprising light pen 90 and light pen circuit 60 for use with a display having inherent memory. The display comprises display device 50 and control circuit 80 for controlling the writing and erasing of information on display device 50 in a conventional manner. Display device 50 is depicted illustratively as a plasma display having a coordinate array of cross-point display cells defined by row and column conductors disposed on respective dielectric material substrates. The dielectric material substrates are spaced apart and gaseous display material is disposed therebetween.

As is well known in the art, plasma displays utilize the mechanism of electrical discharge breakdown of the gaseous display material to plasma at selected cross-point display cells for generating images. When an electric field is applied across a display cell, of a breakdown magnitude $V_b$ determined by the pressure-distance characteristic of the particular gaseous display material employed, the gas in the cross-point region breaks down and provides a light-emitting discharge of low current density. As the breakdown discharge and the resultant current flow are established initially at a cross-point display cell, charge is stored on the dielectric material surfaces of the display cell in the immediate vicinity of the cross-point. The stored charge opposes the voltage drop across the display cell and quickly reaches a level where the voltage across the cell becomes too low to maintain the discharge, thereby quenching the discharge at the cross-point. The stored charge provides the display cell with memory.

Figures 2A, 2B, 2C, 2D:
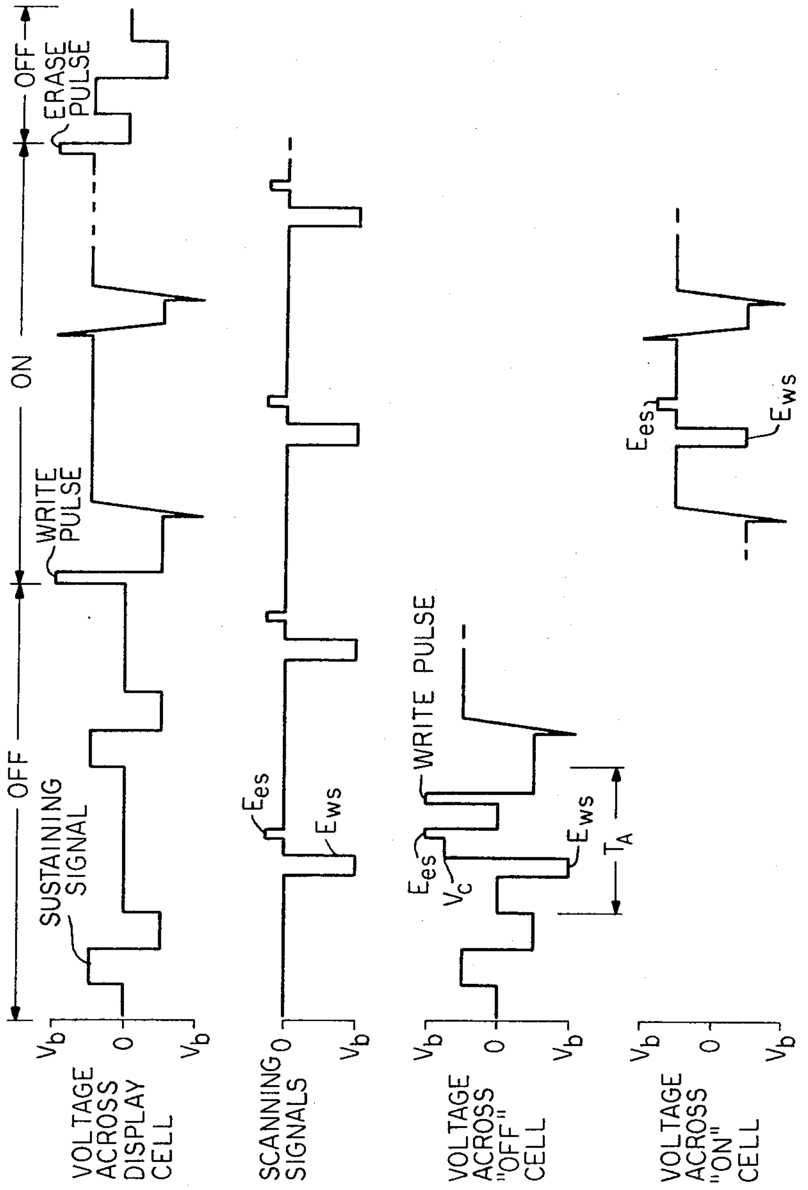
FIGS. 2A–D are time charts useful in describing the operation of the illustrative embodiment of FIG. 1.

In operation, an alternating current sustaining signal voltage provided by source 20, which may be either sinusoidal or pulsed, is extended by control circuit 80 across each display cell via the row and column conductors. The sustaining signal voltage extended by source 20 across each display cell if of a magnitude less than the breakdown voltage level $V_b$. For example, the sustaining signal voltage may be on the order of one-half the breakdown voltage level, as depicted in FIG. 2A.

Addressing of the individual cross-point display cells by addressing circuit 30 is effected using conventional addressing or scanning techniques, such as those known in the display and television art. The addressed cells are selectively energized or deenergized to write or erase information, respectively, in accordance with input signals received by write-erase circuitry 40 from signal source 10. An addressed display cell is energized, for example, by the application of coincident signals in the form of a write pulse to the particular row and column conductors defining the cell. The write pulse is of a magnitude sufficient to effect momentary breakdown of the gaseous display material at the selected cell, permitting current flow thereacross to store charge on the adjacent dielectric material surfaces. The level of charge stored is determined principally by the net voltage across the cell during breakdown, and for the illustrative embodiment herein, is depicted in FIG. 2A as being on the order of one-half the breakdown voltage level. During succeeding half cycles of the sustaining signal, the charge stored on the dielectric material surfaces of the display cells, in combination with the sustaining signal voltage thereacross, causes periodic breakdown of the gas at the display cells to emit light in the form of pulsed discharges.

Conversely, a selected display cell is turned OFF by applying an erase pulse to the row and column conductor defining the selected cell such that the erase pulse removes or erases the charge stored at the cell. The erase pulse is of sufficient magnitude, in combination with the stored charge, to cause momentary breakdown of the gas at the selected display cell as depicted in FIG. 2A. The resulting current flow removes the charge stored on the dielectric material surfaces of the cell, and no further discharge occurs at the cell until another write pulse is applied.

As mentioned above, it is desirable in certain display systems that an operator be able to draw or write images directly on the display device by manipulation of a pen-like instrument. According to my invention, light pen 90 and light pen circuit 60 are provided for this purpose. Light pen 90 may be of any suitable configuration known in the art and, for example, may be identical to light pens employed with CRT display systems. Light pen 90 comprises a conventional light transducer which is enabled by light generated by display device 50 within the field of view of pen 90, the resulting output signal being extended over lead 91 to amplifier 95 in light pen circuit 60. The field of view of light pen 90 is assumed to be one cross-point display cell of device 50. The light generated by display device 50, as will be described below, is in the form of momentary light pulses, producing corresponding output signals on lead 91.

In addition to amplifier 95, light pen circuit 60 includes scanning signal generator 65 and coincidence gate 68. Generator 65 provides scanning signals over lead 63 to address circuit 30 in the form of write scanning signals $E_{ws}$ and erase scanning signals $E_{es}$, as depicted in FIG. 2B. The scanning signals are provided between cycles of the sustaining signal and are extended by address circuit 30 to the individual cells of display device 50 in the normal addressing or scanning sequence. Write scanning signal $E_{ws}$, as shown in FIG. 2B, is of a magnitude equal to or greater than the display breakdown voltage level, while erase scanning signal $E_{es}$ in the illustrative embodiment herein may be on the order of one-fourth the breakdown voltage level and is opposite in polarity to the write scanning signal.

Scanning signal generator 65 also provides gating signals on lead 61 to one input of gate 68 in synchronism with the write scanning signals applied to display device 50. The other input of gate 68 is connected over lead 66 to the output of amplifier 95. Consequently, upon the coincidence of a gating signal on lead 61 and an output signal on lead 66, a signal is extended by gate 68 over lead 64 to write-erase circuitry 40.

With the above description in mind, and with reference to FIGS. 2C and 2D, consider now the operation of light pen 90 and light pen circuit 60 in drawing images on display device 50. The sustaining signal from source 20 is extended over the row and column conductors to each of the display cells of device 50. At the same time, the display cells are sequentially scanned by scanning signals $E_{ws}$ and $E_{es}$ under the control of address circuit 30. Assume then, that a particular display cell is OFF, i.e., that no charge appears on the adjacent dielectric material surfaces and that the cell is not lighted when the cell is addressed by circuit 30, during period $T_A$ in FIG. 2C, to extend the scanning signals across the cell. When write scanning signal $E_{ws}$ is extended to the particular display cell, the gas at the cell breaks down, permitting current flow thereacross to store charge on the adjacent dielectric material surfaces. The resulting current flow across the cell during breakdown is in the form of a current pulse, which may illustratively have a duration on the order of 50 to 75 nanoseconds, causing the cell to emit a pulse of light.

The level of charge stored on the dielectric material surfaces of the cell is determined principally, as mentioned above, by the net voltage across the cell during breakdown and is depicted in FIG. 2C as level $V_c$. The immediately succeeding erase scanning signal $E_{es}$ applied to the cell is of sufficient magnitude, in combination with the stored charge on the cell, to again break down the cell, this time removing the stored charge from the cell. The address cell is thus turned ON by write scanning signal $E_{ws}$ and is turned OFF immediately thereafter by scanning signal $E_{es}$. Similarly, the other OFF cells of display device 50 are turned ON momentarily in sequence during each scanning cycle by the scanning signals.

Assume now that light pen 90 is placed adjacent an OFF display cell, such that the cell is within the field of view of pen 90. When the particular OFF cell is next addressed and consequently turned ON momentarily by the scanning signals from generator 65, the light pulse emitted thereby is detected by light pen 90 to provide a corresponding signal on lead 91. The signal on lead 91 is amplified by amplifier 95 and is extended over lead 66 to one input of gate 68. Concurrently, a gating signal is directed over lead 61 by generator 65 to the other input of gate 68, extending the signal on lead 66 through gate 68 over lead 64 to write-erase circuitry 40.

Responsive to the signal on lead 64, write-erase circuitry 40 provides a write pulse signal to address circuit 30, which extends a conventional write pulse to the addressed display cell, that is, to the cell from which the light pulse was derived. In the manner described above, the write pulse effects breakdown of the addressed cell to turn the cell ON as depicted in FIG. 2C. Additional ones of the OFF display cells at other cross-points in display device 50 are turned ON similarly by placing light pen 90 adjacent thereto. Thus, as light pen 90 is manipulated adjacent display device 50, each cell of device 50 that light pen 90 passes adjacent is lighted to draw a desired image.

Display cells of device 50 which are already lighted remain ON and are unaffected by the scanning signals applied thereto or by the placement of light pen 90 adjacent thereto. When an ON display cell is addressed to circuit 30 during scanning the write scanning signal $E_{ws}$ extended thereacross is insufficient to effect breakdown of the gas at the cell, as may be seen from FIG. 2D. Similarly, the subsequent erase scanning signal $E_{es}$ extended thereto is insufficient to effect breakdown of the cell and, consequently, neither of the scanning signals alter the charge stored at the cell.

An existing image can be erased using light pen 90 in a manner similar to that described above, causing write-erase circuitry 40 to provide erase signals to address circuit 30 as pen 90 is manipulated adjacent the display cells during scanning. The scanning signals provided by generator 65 for erase operation should be such that OFF cells are unaffected thereby, but ON cells are momentarily energized to emit light pulses for detection by light pen 90. For example, the scanning signals applied to the addressed display cells for erase operation may be substantially similar to the sustaining signal shown in FIG. 2A but, of course, displaced in time to the addressing period between sustaining signals. Thus, light pen 90 and light pen circuit 60 may be employed in either a write mode or an erase mode of operation by causing write-erase circuitry 40 to selectively generate conventional write or erase pulses, respectively, in response to signals on lead 64.

According to a further aspect of the invention, light pen 90 and light pen circuit 60, unlike the voltage pen arrangements heretofore, advantageously permit the generation of display information (the signals on lead 64 in conjunction with the addressing signals from address circuit 30) for external storage and subsequent display, either on display device 50 or on similar display devices. In addition, the signals on lead 64 may be employed advantageously in the erase mode of operation for checking or transmitting the existing display image, rather than for erasing the image.

It is to be understood that the above-described arrangements are but illustrative of the application of the principles of my invention. Numerous other arrangements may be devised by those skilled in the art without departing from the spirit and scope of the invention.

What is claimed is:

1. A light pen arrangement for use with a multicell display having means for periodically scanning the display cells in sequence and having means for writing information in selected ones of said display cells; said light pen arrangement comprising, means operative with said scanning means for lighting individual ones of said display cells momentarily in sequence, a light transducer having a field of view adapted to detect said momentary lighting of individual ones of said cells, and means responsive to said light transducer for operating said writing means.

2. An arrangement according to claim 1 wherein said lighting means comprises means for providing a pair of scanning pulses to said individual cells, the first of said pair of scanning pulses turning the individual cell ON and the second of said pair turning the individual cell OFF, causing said individual cells to emit pulses of light.

3. An arrangement according to claim 2 wherein said light transducer is adapted to detect a pulse of light from an individual one of said cells and to provide an output signal in response thereto, said operating means being responsive to said output signal for operating said writing means to write information in said one cell emitting said detected pulse of light.

4. A light pen arrangement for a display including a plurality of cells having inherent memory, means for addressing individual ones of said cells, and write-erase means operative for altering the memory content of an addressed cell; said light pen arrangement comprising, means for operating said addressing means to cause one of said cells to emit a pulse of light, means for detecting said pulse of light and for operating said altering means in response thereto, whereby the memory content of the addressed cell emitting said pulse of light is altered.

5. An arrangement according to claim 4 wherein said detecting means comprises an optical transducer movable adjacent said display cells, gating means connected to the output of said transducer, and means for enabling said gating means concurrently with the emission of said light pulse, thereby extending the output of said transducer to said altering means.

6. A light pen arrangement for a multi-cell display having inherent memory for storing display information comprising, means including scanning pulse generating means for periodically causing individual ones of the cells of said display to emit a pulse of light, light pulse detecting means, and means responsive to said scanning pulse generating means and to said detecting means for altering display information stored in said display memory.

7. A light pen arrangement for a display including a plurality of cells having inherent memory and including means for addressing individual ones of said cells; said light pen arrangement comprising, means for operating said addressing means to cause one of said cells to emit a pulse of light responsive to said one cell being in a predetermined memory state, and light pulse transducer means movable adjacent said one cell for detecting said pulse of light and for producing an output signal responsive thereto, said output signal being representative of said one cell being in said predetermined memory state.

8. An arrangement according to claim 7 wherein said display includes means operative for changing the memory state of individual ones of said cells, said light pen arrangement further comprising means responsive to said output signal for operating said changing means to change the memory state of said one cell.

9. In combination, a display including a plurality of cells having inherent memory, each of said cells residing in one or the other of two memory states, means for scanning the individual cells of said display to light momentarily each of said cells having memory residing in said one state, a light detecting transducer movable adjacent said individual cells of said display, and write-erase means connected to said transducer and to said scanning means, said write-erase means being operative during movement of said transducer adjacent individual of said display cells for changing the memory state of said individual cells.

* * * * *